(12) United States Patent
Bryson et al.

(10) Patent No.: US 11,241,024 B1
(45) Date of Patent: Feb. 8, 2022

(54) PROCESS FOR PRODUCING COOKABLE, FIBROUS MEAT ANALOGUES WITH DIRECTIONAL FREEZING

(71) Applicants: NEW SCHOOL FOODS INC., Toronto (CA); Dérick Rousseau, Brampton (CA); Auke De Vries, Toronto (CA)

(72) Inventors: Christopher Bryson, Toronto (CA); Dérick Rousseau, Brampton (CA); Auke De Vries, Toronto (CA); Christopher Mark Gregson, Princeton, NJ (US)

(73) Assignee: NEW SCHOOL FOODS INC., Toronto (CA)

( * ) Notice: Subject to any disclaimer, the term of this patent is extended or adjusted under 35 U.S.C. 154(b) by 0 days.

(21) Appl. No.: 17/326,567

(22) Filed: May 21, 2021

(51) Int. Cl.
| | |
|---|---|
| *A23J 3/24* | (2006.01) |
| *A23J 3/08* | (2006.01) |
| *A23J 3/22* | (2006.01) |
| *A23J 3/28* | (2006.01) |
| *A23L 29/00* | (2016.01) |
| *A23L 33/12* | (2016.01) |
| *A23L 33/15* | (2016.01) |

(Continued)

(52) U.S. Cl.
CPC . *A23J 3/24* (2013.01); *A23J 3/08* (2013.01); *A23J 3/227* (2013.01); *A23J 3/28* (2013.01); *A23L 29/06* (2016.08); *A23L 29/256* (2016.08); *A23L 33/12* (2016.08); *A23L 33/15* (2016.08); *A23L 33/16* (2016.08); *A23V 2002/00* (2013.01)

(58) Field of Classification Search
None
See application file for complete search history.

(56) References Cited

U.S. PATENT DOCUMENTS

| 3,870,808 A | 3/1975 | Boyer et al. |
| 4,001,459 A | 1/1977 | Kim et al. |
| (Continued) | | |

OTHER PUBLICATIONS

Kappos: Ten Tips for Streamlining Patent Prosecution Monday, Jun. 28, 2010 (Year: 2010).*

(Continued)

*Primary Examiner* — Patricia A George
(74) *Attorney, Agent, or Firm* — Hill & Schumacher

(57) ABSTRACT

The present disclosure provides a process for producing "cookable", fibrous meat analogues employing directional freezing. The process includes subjecting an ingestible polysaccharide containing hydrogel of selected size and shape to directional freezing for inducing formation of elongated ice crystals with said elongated ice crystals aligned in a given direction in the ingestible hydrogel to form a textured hydrogel containing ice crystals. Following this the textured hydrogel is immersed in a solution containing an ingestible soluble protein at a preselected temperature so that as the ice crystals melt, the ingestible heat gelling protein diffuses into the texture hydrogel replacing the ice crystals. The textured hydrogel is immersed in the solution containing the ingestible heat gelling protein for a selected period of time required to give a desired amount of protein loading. The protein-infiltrated hydrogel is then heat-treated at a temperature sufficient to induce gelling and fiber formation within the hydrogel.

27 Claims, 2 Drawing Sheets

(51) Int. Cl.
*A23L 33/16* (2016.01)
*A23L 29/256* (2016.01)

(56) References Cited

U.S. PATENT DOCUMENTS

| | | |
|---|---|---|
| 4,084,017 A | 4/1978 | Kim et al. |
| 4,087,566 A | 5/1978 | Kim et al. |
| 4,423,083 A | 12/1983 | Shenouda |
| 2011/0305812 A1 | 12/2011 | Fujiwara |

OTHER PUBLICATIONS

Boukid: Plant based meat analogues: from niche to mainstream; Revised: Sep. 29, 2020 / Accepted: Oct. 3, 2020; European Food Research and Technology (2021) 247:297-308. (Year: 2020).*
Giraja: Production Methodologies of Meat Analogues: A Review; Journal of Agricultural Engineering vol. 58 (2): Apr.-Jun. 2021; Revised manuscript accepted: Apr. 2021. (Year: 2021).*
Birgit: Review: Structuring processes for meat analogues; Trends in Food Science & Technology, vol. 81, Nov. 2018, pp. 25-36. (Year: 2018).*

* cited by examiner

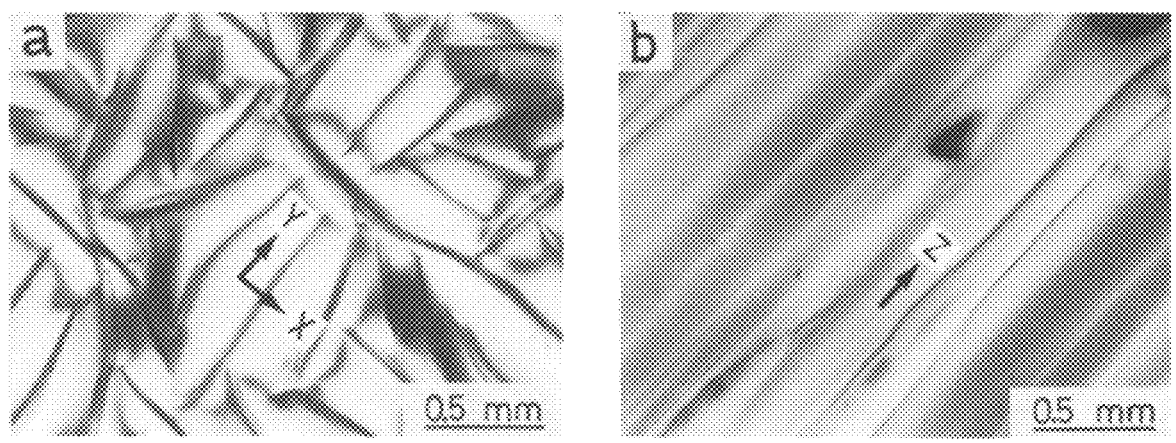
Fig. 2. Polarized optical micrographs of a) transverse, and b) longitudinal cross sections of the directionally frozen/thawed agarose hydrogel

PROCESS FOR PRODUCING COOKABLE, FIBROUS MEAT ANALOGUES WITH DIRECTIONAL FREEZING

FIELD

The present disclosure relates to a process for producing "cookable", fibrous meat analogues using directional freezing of hydrogels.

BACKGROUND

The $1.4T global meat sector is experiencing unprecedented disruption due to the growth of plant-based alternatives, projected to be worth US $140B in the next 10 years (nearly 10% of the global meat market). Plant-based substitutes for meat and fish are coming into demand by many consumers who wrestle with the ethical issues of eating animal-based protein products, such as vegans, vegetarians and the like. Consumers with various food allergies to meat or fish also are looking for plant-based alternatives. The growth of this industry is expected to continue for decades to come; the global meat industry would need to grow by 69% by 2050 to meet population growth. This will be especially challenging given that animal-based protein is significantly more resource-intensive to produce in terms of water usage, land usage, and GHG emissions compared to plant-based protein. Moreover, 90% of the planet's wild fish species are already classified as overfished or harvested at maximal capacity. This means that the opportunity for plant-based foods will only increase over time, driven by mounting pressure from customers, special interest groups/NGOs, and governments. Due to the increased strain on the planet's resources, from a food security point of view, having a ready alternative to animal-based protein food products is in every countries' best interest.

Another impetus for transitioning from animal-based protein to plant-based protein alternatives is being driven by the increasing outbreaks of animal diseases which are known to jump to humans. These are referred to zoonotic diseases (or zoonoses) which are caused by germs that jump from animals to humans and are particularly problematic in those parts of the world where poor farming practises lead to close contact between animals and humans. There are two modalities for the infection of humans by animals, the most common being viral infection between the humans in close contact with the animals due to airborne spread of viruses from animal to humans, and the other is due to ingestion and consumption of the animals by humans. The impact of these diseases on the economies of countries relying heavily upon animal-based agriculture can be devastating, let alone the human toll when these animal-based diseases start transmitting to humans.

Probably the most notable of these diseases passed on to humans by consuming beef meat is Bovine Spongiform Encephalopathy (BSE) which was first identified in cattle in 1985 in the UK. It was linked to variant Creutzfeldt-Jakob disease in humans and it was the consumption of infected meat that caused transmission to humans. Nearly two hundred (200) people in the UK died of this disease and led to the culling of millions of cattle. BSE is a neurological disorder caused by a rare transmissible agent called a prion, and began appearing in cattle in the 1970s. The main cause was identified as animal feed including meat and bone meal (MBM) from rendered or infected cows. More than 100,000 cattle were confirmed infected. The use of MBM was banned in 1988, but was linked to a rare illness called Creutzfeldt-Jakob disease (CJD) in humans. The BSE-linked version was named variant CJD and could manifest in a consumer of the infected meat many years after eating the infected meat, was in a number of cases fatal.

Similarly, humans ingesting fish can also lead to illness. Zoonotic diseases associated with fish contact are primarily bacterial infections. These include *Mycobacterium, Erysipelothrix, Campylobacter, Aeromonas, Vibrio, Edwardsiella, Escherichia. Salmonella, Klebsiella* and *Streptococcus iniae*. While these infections do not always make fish appear ill, they can cause serious illness in humans. The effects of global warming on a growth in zoonotic diseases in animals and fish has yet to be quantified or understood and it would not be unreasonable to believe that increasing ocean temperatures and ambient temperatures could cause more outbreaks of zoonotic diseases. Thus, there is a growing impetus to find plant-based alternatives to meat and/or fish from safer sources of protein that do not require as much resources currently required with animal-based protein sources.

Unfortunately, it has proven difficult for plant-based meat alternatives on the market today to appeal to the mass market customer because of the difficulties to adequately emulate the taste, texture, nutritional profile, and cooking behavior of real meat. These products sometimes use basic formulations and untailored processes that highlight a lack of R&D investments from the manufacturer. Consumer research has pointed out that consumers rely primarily on 3 criteria when making purchasing decisions for meat vs. alt-meat products: price, taste, and convenience. Thus, if a plant-based meat alternative does not have a comparable taste to real meat, is more expensive, and/or is less convenient to prepare, it will likely only appeal to niche vegetarian and vegan segments.

Within the alternative protein industry, almost all efforts are focused on alternatives that emulate beef, chicken and pork, with little efforts directed to alternative, plant-based seafood. Plant-based seafood accounted for only 1% of total plant-based meat alternative sales in 2019, representing only 0.07% of total seafood sales ($105M). If the plant-based seafood market can reach 10% of the total seafood market in 2030, just as the overall plant-based meat market is projected to hit 10% of global meat sales, it will be worth $20B.

SUMMARY

The present disclosure provides a two-step process for producing meat analogues by directional freezing of a hydrocolloid gel. In the first step the hydrocolloid gel is directionally frozen. This process induces meat or fish-like muscle fiber formation and texture change to the hydrocolloid gel due to the formation of ice crystals that align the hydrogel fibers. A soluble protein is then infused into the textured hydrogel by immersion of the hydrogel in a protein solution for a specific time at a preselected temperature so that the aligned ice crystals are replaced by the soluble protein in the textured hydrogel. Subsequent heating of the infused hydrogel induces gelation. Using a hydrocolloid with a melting temperature above the gelling temperature of the protein is preferred to maintain size, structure and fibration of the product More particularly, the present disclosure provides a process for producing fibrous meat analogues, which comprises subjecting an indestible polysaccharide hydrogel to directional freezing inducing formation of aligned elongated ice crystals to form a directionally frozen polysaccharide hydrogel with aligned channels in which the aligned elongated ice crystals are located. The directionally frozen polysaccharide hydrogel with the aligned channels is then thawed by immersing the frozen indestible polysaccharide hydrogel in a solution containing at least one ingestible soluble heat gelling protein, thereby melting and replacing the aligned elongated ice crystals with the at least one ingestible soluble heat gelling protein at a temperature below the gelling temperature of the soluble heat gelling protein, to produce a protein infused polysaccharide hydrogel. The protein loading varies based on the immersing time. The thawed protein infused polysaccharide hydrogel is heated at a temperature above the gelling temperature of the at least one ingestible solube heat gelling protein to create protein fibers to form a fibrous meat analogue food product.

The at least one ingestible soluble heat gelling protein may comprise:

i) an ingestible soluble heat gelling protein, wherein a concentration of the ingestible soluble heat gelling protein in the solution containing at least one ingestible soluble heat gelling protein is in a range from about 0.5 to about 30%; or ii) a mixture of ingestible heat gelling protein and a non-heat gelling protein.

The ingestible polysaccharide hydrogel has a melting temperature greater than the gelling temperature of the ingestible soluble heat gelling protein.

The ingestible soluble heat gelling protein may be any one or combination of whey protein isolate (WPI), soy protein, potato protein isolate, rubisco protein, mung bean protein and pea protein.

The solution containing at least one ingestible soluble heat gelling protein may further comprise an ingestible non-heat gelling protein, and a heat induced trigger agent to trigger gelling of the ingestible non-heat gelling protein as the temperature is raised. The heat induced trigger agent comprise: a salt, enzyme, pH modifier, or combination thereof.

The heat induced trigger agent may be an enzyme microencapsulated within a meltable coating.

The step of heat treating the ingestible soluble heat gelling protein infused polysaccharide hydrogel may be conducted at a solution temperature in a range from bout 40° C. to about 150° C.

The ingestible polysaccharide hydrogel may be selected from the group consisting of agar, fermentation derived gelatin, alginate, curdlan, kappa-carrageenan, kappa 2-carrageenan and iota-carrageenan, furcelleran, starch, modified starch, dextrins, koniac glucomannan, gellan gum, and combinations of xanthan qum, guar gum, locust bean gum and tara gum.

The solution containing at least one ingestible soluble heat gelling protein may comprise an aqueous solution or aqueous dispersion. The aqueous solution or aqueous dispersion may comprise: flavors, tastants, emulsifiers, preservatives, colors, pH modifiers, texture modifiers or a combination thereof.

The at least one ingestible soluble heat gelling protein may be a mixture comprising an ingestible heat gelling protein and an ingestible non-heat gelling protein, and the solution containing at least one ingestible soluble heat gelling protein may comprise about 15 to about 25 wt% of protein.

The concentration of the at least one ingestible soluble heat gelling protein in the solution may be in a range from about 10 to about 30 wt%.

The solution containing the at least one ingestible soluble heat gelling protein may have a temperature of about 10° C. to about 60° C.

The protein loading further varies by varying a volume ratio of the ingestible polysaccharide hydrogel and the solution containing the at least one ingestible soluble heat gelling protein.

The step of directional freezing of the ingestible polysaccharide hydrogel may be conducted by placing the ingestible polysaccharide hydrogel in contact with a pre-cooled substrate at a temperature of about minus 2° C. to about minus 196° C.

The ingestible polysaccharide hydrogel may comprise a kappa-carrageenan hydrogel.

The ingestible polysaccharide hydrogel may be a kappa-carrageenan hydrogel having a modulus in a range from about 100 to about 5000 Pascals.

The ingestible polysaccharide hydrogel may be an agar hydrogel having an agar concentration in a range from about 0.1% to about 15wt %.

The solution containing at least one ingestible soluble heat delling protein may further include ingestible supplements that diffuse into the aligned channels. These ingestible supplements may comprise: emulsions of esters of omega-3, omega-6, omega-9 fatty acids or a combination thereof.

The ingestible supplements may comprise: water-soluble vitamins, including ascorbic acid (vitamin C), thiamin, riboflavin, niacin, vitamin $B_6$ (pyridoxine, pyridoxal, and pyridoxamine), folacin, vitamin $B_{12}$, biotin, and pantothenic acid.

The ingestible supplements may comprise ingestible minerals.

The ingestible supplements may comprise water insoluble vitamins.

The ingestible supplements may comprise anti-oxidants.

The step of subjecting the ingestible polysaccharide hydrogel to directional freezing and inducing formation of aligned elongated ice crystals, may further comprise:

placing the ingestible polysaccharide hydrogel in contact with a pre-cooled substrate to dive directional freezing in one direction, or placing the ingestible polysaccharide hydrogel between two pre-cooled substrates, wherein the directional freezing proceeds from opposite directions.

The at least one ingestible soluble heat gelling protein may comprise:

i) a heat gelling protein, wherein a concentration of the inhestible heat gelling protein in the solution is in a range from about 0.5 to about 30%; or ii) a mixture of heat gelling protein and a non-heat gelling protein, wherein a concentration of the ingestible heat gelling protein in the solution containing at least one ingestible soluble heat gelling protein is in a range from about 2 to about 10 wt% with the remainder being non-heat gelling protein to make up to a total of 25 wt% of the protein mixture.

BRIEF DESCRIPTION OF THE DRAWINGS

Embodiments will now be described, by way of example only, with reference to the drawings, in which:

FIG. 2 shows polarized optical micrographs of a) transverse, and b) longitudinal cross sections of directionally frozen/thawed agarose hydrogel, as disclosed in Yokoyama, F., Achife, E. C., Momoda, J., Shimamura, K. and Monobe, K., 1990. Morphology of optically anisotropic agarose hydrogel prepared by directional freezing. Colloid and Polymer Science, 268(6), pp. 552-558.

DETAILED DESCRIPTION

Figure 1:
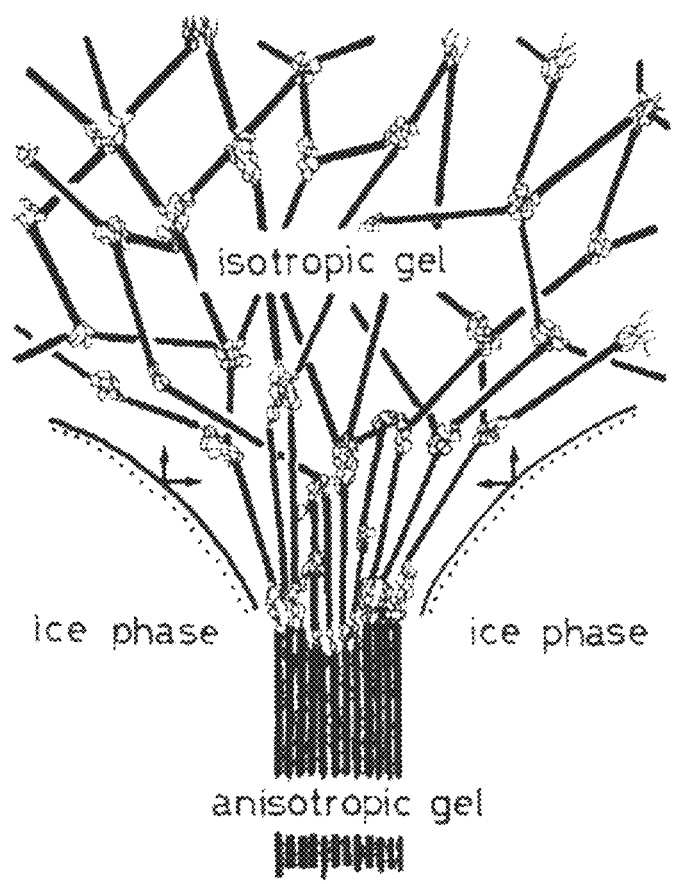
FIG. 1 shows an isotropic hydrogel undergoing directional freezing in which the fibers of the hydrogel in contact with the pre-cooled substrate begin to align in a direction perpendicular to the plane of the substrate and this alignment progresses away from the cooled substrate until the entire mass is directionally aligned, and this is accompanied by the formation of ice crystals aligned with the aligned fibers of the hydrogel.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

The present disclosure provides a process for producing a "cookable", fibrous meat analogs by employing directional freezing. The process includes subjecting an ingestible polysaccharide containing hydrogel of selected size and shape to directional freezing to induce formation of elongated ice crystals with the elongated ice crystals aligned in a given direction in the ingestible hydrogel to form a textured hydrogel containing ice crystals. Following this, the textured hydrogel is immersed in a solution containing an ingestible soluble protein at a preselected temperature so that as the ice crystals melt, the ingestible heat gelling protein diffuses into the texture hydrogel replacing the melted ice crystals. The textured hydrogel is immersed in the solution containing the ingestible heat gelling protein for a selected period of time required to give a desired amount of protein loading. The protein-infiltrated hydrogel is then heat treated at a temperature sufficient to induce gelling and to form fibers within the hydrogel for producing the cookable, fibrous meat analogue food product. An example product is a salmon fillet analogue product.

Directional Freezing

The process of directional freezing involves freezing a material by controlling the direction that the water freezes. The step of directional freezing of the hydrogel is conducted by placing the hydrogel of selected size and shape in contact with a pre-cooled substrate to induce ice crystal formation extending in a direction perpendicular to the pre-cooled substrate through the hydrogel, and wherein the pre-cooled substrate is cooled to a temperature in a range from about $-2°$ C. to about $-196°$ C.

Referring to FIGS. 1 and 2, the principal concept of directional freezing of a hydrogel is illustrated, in which a selected mass and shape of a hydrogel is placed on a pre-cooled substrate, which is indicated as an aluminum substrate cooled to $-18°$ C., upon which the isotropic fibers of the hydrogel begin to align perpendicular to the pre-cooled substrate which also results in the formation of aligned anisotropic elongated ice crystals with the elongated ice crystals aligned in a given direction in to form a textured hydrogel containing aligned ice crystals. This is a freeze-concentration effect wherein polysaccharides are pushed together into a smaller volume of higher concentration as the water and polysaccharide increasingly phase-separate from the initial solution as ice forms.

This process results in a fibrous texture that mimics typical the muscle fiber structure found in many fish species such as, but not limited to, salmon, trout, tuna and cod to mention a few examples. Though it is not even limited to that; we could also use it to make analogues of other food products characterized by fibrous textures, such as but not limited to, beef steak or chicken fillet.

Upon thawing of the textured hydrogel in the presence of an aqueous solution or aqueous dispersion containing species, such as, but not limited to, ingestible soluble proteins capable of diffusing into the product, as the aligned ice crystals melt, the species diffuse into the textured product to replace the melted ice crystals.

While FIG. 1 shows the use of a single pre-cooled plate, it will be appreciated that two (2) plates could be used, one below and one on top of the hydrogel mass.

In addition, the substrates that are the pre-cooled plates may be molds that have the same shape and size of the food products being produced. For example, the mold may be of roughly the same size and shape of a salmon filet being produced, with one single substrate could be used which is molded so that when filled with the hydrogel the final product with have roughly the same size and shape as a fillet of salmon. Alternatively, a whole fish may be produced by having a top and bottom mould sized and shaped so that when the top and bottom and connected with the hydrogel inside, the interior size and shape mimics a whole fish.

Hydrogels

Hydrogels are comprised of a network of crosslinked polymer chains which are generally hydrophilic. The interactions between the polymer chains cause cross-linking and results in the formation of a three-dimensional network, entrapping the aqueous liquid into a semi-solid structure. The crosslinks between polymers can either be chemical or physical and are comprised of, but not limited to, hydrogen bonds, hydrophobic or ionic interactions, and chain entanglements. These crosslinks are strong enough such that the integrity of the hydrogel network is preserved and the polymers do not readily dissolve back into solution. Hydrogels are characterized by being highly absorbent natural or synthetic polymeric networks and they can easily contain over 90% water.

Physiologically Compatible Hydrogels

The present process for producing cookable, fibrous meat analogs, uses an ingestible polysaccharide containing hydrogel. There are numerous types of polysaccharide-containing hydrogels. Non-limiting examples of such hydrogels include carrageenans which are a family of natural linear sulfated polysaccharides extracted from red edible seaweeds and which exhibit a high efficacy for binding strongly to food proteins. Carrageenans are large, highly flexible molecules that form curling helical structures which confers on them the ability to form a variety of different gels at room temperature and hence why they are widely used in the food industries in particular as stabilizing and thickening agents.

These carrageenans typically contain from about 15 to about 40% ester-sulfate content, which produces anionic polysaccharide. They are categorized into three different classes based on their sulfate content. Kappa-carrageenan (K-carrageenan) has one sulfate group per disaccharide, iota-carrageenan (I-carrageenan) has two, while lambda-carrageenan (L-carrageenan) has three. K-carrageenan is characterized in that it forms strong and rigid gels in the presence of potassium ions, and reacts with dairy proteins, while I-carrageenan forms soft gels in the presence of calcium ions, and finally, L-carrageenan does not gel but is useful for thickening dairy products. Carrageenans are high-molecular-weight polysaccharides and mostly made up of alternating 3-linked b-D-galac-topyranose (G-units) and 4-linked a-D-galactopyranose (D-units) or 4-linked 3,6-anhydro-a-D-galactopyranose (DA-units), forming the disaccharide repeating unit of carrageenans.

Another class of ingestible hydrogels include agar hydrogels which are jelly-like substances which are obtained from red algae and is a mixture of two constituents, linear polysaccharide agarose, and a heterogeneous mixture of smaller molecules termed agaropectin. It forms the supporting structure in the cell walls of certain species of algae, and is released on boiling. These algae are termed agarophytes, and belong to the rhodophyta (red algae) phylum.

Agar hydrogels have been used as a food ingredient, for example as a vegetarian substitute for gelatin, a thickener for soups, ice cream, in fruit preserves, and the like. Agar hydrogels have also been used for other physiological applications such as an appetite suppressant, and as a laxative, to mention a few. The gelling agent in agar is an unbranched polysaccharide isolated from the cell walls of various species of red algae. Those skilled in the art will know that these ingredients such as agar and carrageenan are widely used in the food industry.

Thus, non-limiting examples of the ingestible polysaccharide containing hydrogels agar, fermentation derived gelatin, alginate, curdlan, a carrageenan selected from the group consisting of Kappa-carrageenan, Kappa 2-carrageenan and iota-carrageenan, furcelleran, starch (including modified starch and dextrins), agar, Konjac glucomannan, gellan gum, as well as combinations which include xanthan gum, guar gum, locust bean gum and tara gum.

Proteins

Whey protein isolate (WPI) is a dietary supplement as well as a food ingredient which is produced by separating components from whey. Whey is a milk by-product of the cheese-making process which can be processed to yield whey protein in three different forms including whey isolate, whey concentrate and whey hydrolysate. The difference between these protein forms relates to the composition of the product, specifically the protein content. Whey isolates contain the highest amount of protein and may be lactose free, as well as carbohydrate free, fat free, and cholesterol free.

These proteins are characterized by being highly bioavailable and are absorbed into the body quickly as well as having a high concentration of branched-chain amino acids (BCAAs) that are highly concentrated in muscle tissue, and are used stimulate protein synthesis in addition to fueling working muscles.

While the present food products include the use of WPI in the examples of the present disclosure, it will be appreciated by those skilled in the art that many other plant-based proteins that provide excellent heat gelling proteins which may be used and may be readily identified by those skilled in the art. Non-limiting examples include soy protein, potato protein isolate, rubisco protein, mung bean protein and pea protein. In order to be efficacious in respect of heat gelling, the proteins will have the following properties of solubility (>85%), viscosity (preferably low viscosity at room temperature and high at temperatures >>50° C.), denaturation temperature (about 45 to about 85° C.) and gel strength criteria (G'>100 Pascals).

The ingestible soluble protein is preferably a naturally heat gelling protein and when these are used, the ingestible polysaccharide containing hydrogel and ingestible heat gelling protein are selected such that the hydrogel has a melting temperature greater than the gelling temperature of the protein to maintain size, structure and fibration of the fibrous meat analogue food product.

In some embodiments the ingestible soluble protein is an ingestible non-heat gelling protein, in which case a heat inducing trigger agent is included to trigger gelling as the temperature is raised. The trigger agent induces gelation of the otherwise non-gelling protein. The trigger agent could be pre-mixed in with either the protein or the hydrogel phase. The heat inducing trigger agent can be any one or combination of a salt, enzyme or pH modifier. For example, the salt, pH modifier or enzyme microencapsulated within a meltable coating which is triggered by heating. This microencapsulated material could be in either phase. Non-limiting examples of a pH modifier includes glucono-delta-lactone. Non-limiting examples of enzyme-based trigger agents include transglutaminase. Non-limiting examples of salt-based trigger agents include calcium phosphate.

Whether or not the protein is heat gelling or not, the protein impregnated hydrogel product is heated such that the internal temperature rises to between 50 and 100° C., inducing protein denaturation and gelation. This might be done using a technique that uses much high temperatures (oven, grill, frying pan, broiler to mention a few examples). The goal of this heating step is to produce a product that goes through a transition on heating leading to a change in color and/or texture (preferably both) similar to that with traditional fish.

The solution in which the frozen hydrogel is immersed can contain 100% heat gelling protein only, but also a mixture of heat gelling protein and non-heat-gelling (i.e., a non-functional) protein. The concentration of heat gelling protein can be smaller than the total protein content. For instance, of a 15% total protein solution, 5% can be a heat-gelling protein, the remainder being non heat gelling protein. It is noted that these amounts are non-limiting.

The concentration of the ingestible soluble total protein in the aqueous solution or aqueous dispersion is in a range from about 1 to about 35 wt %. More preferably the concentration of the ingestible soluble protein in the aqueous solution or aqueous dispersion is in a range from about 10 to about 30 wt %. More preferably the concentration of the ingestible soluble protein in the aqueous solution or aqueous dispersion is in a range from about 15 to about 25 wt %.

The step of immersing the protein infiltrated textured hydrogel into the solution is done at a preselected temperature in a range from about 0° C. to about 80° C. and preferably from about 1° C. to about 7° C. and may be carried out at a typical refrigerator temperature of 4° C., with the temperature being selected so that the aligned ice crystals slowly melt and as they do the proteins, and any other additional constituents diffuse in and replace the ice crystals.

The amount of protein loading, and any other constituents or supplements, is controlled by varying the selected period of time that the textured hydrogel is immersed in the solution containing the ingestible soluble protein and other constituents in order to vary the amount of protein and other constituents loaded into the textured hydrogel in a time dependent manner. The amount of protein loading can also be changed by the protein concentration in the immersion liquid as well as the ratio in weight or volume between the frozen hydrogel and the immersion liquid in which it is placed.

In embodiments where the ingestible polysaccharide containing hydrogel is a K-carrageenan hydrogel, specific ions may be included in the ingestible soluble protein containing solution or in the interior of the hydrogel (or both) for mitigating swelling and shrinkage in a concentration dependent manner and increasing stiffness of the K-carrageenan gels compared to the stiffness in the absence of ions, and for preserving fiber formation in the directionally frozen K-carrageenan gels upon extended storage.

When the hydrogel is a K-carrageenan hydrogel it preferably has a concentration range from about 0.1% to about 15 wt %. Similarly, when the hydrogel is an agar hydrogel it preferably has a concentration in a range from about 0.1% to about 15 wt %. This results in a modulus from about 100 to 5000 Pascals. Non-limiting examples of further constituents or supplements includes any one or combination of flavors, tastants, emulsifiers, preservatives, colors and texture modifiers. Additional supplements may include emulsions of any one or combination of omega-3, omega-6, omega-9 fatty acids. With regard to omega-3 supplements, preferred modes would use omega 3 fatty acids predominantly in the form of fatty acids esters such as, but not limited to, triglycerides. Examples of ingestible supplements include water-soluble vitamins including ascorbic acid (vitamin C), thiamin, riboflavin, niacin, vitamin $B_6$ (pyridoxine, pyridoxal, and pyridoxamine), folacin, vitamin $B_{12}$, biotin, and pantothenic acid. Water insoluble vitamins may also be included, including any one or combination of vitamins A, D, E and K. Ingestible minerals may be included, including anyone or combination of iron, magnesium, manganese, zinc and calcium. Other ingestible supplements include anti-oxidants, such as, but not limited to, tocopherols.

The heat treated, protein (and optionally) the other supplements or additives infiltrated into the textured hydrogel may be packaged and stored at temperatures in a range from about 4° C. to about 7° C. but they may be stored in a wider range of temperatures.

There exist methods on using directional freezing as a means to produce fibers that resemble meat muscle fiber. In U.S. Pat. No. 4,423,083, a process is described to produce fibers by combining a protein and hydrocolloid followed by freezing. Upon thawing, the fibers are strengthened by a sequestering agent, preserving the fiber structure. In the process disclosed herein, the directional freezing of a hydrocolloid gel is performed first, with a second step of immersion in a protein solution without the need for a sequestering agent so that the need for a sequestering agent is avoided. This very advantageously gives the flexibility to control fiber formation prior to adding other components, such as the proteins, and other supplements as disclosed herein.

Furthermore, U.S. Pat. No. 4,423,083 discloses that it is necessary to slice the frozen mass prior to immersion in the sequestering solution to produce fiber bundles with a maximum thickness of 8 mm to preserve the fibrous character of the innermost part of the sample. In the present disclosure, there is no need for slicing, fiber structures can be preserved without a sequestering agent, and the sample can be of any size or shape.

Therefore what is claimed is:

1. A process for producing fibrous meat analogues, comprising:
    subjecting an ingestible polysaccharide hydrogel to directional freezing inducing formation of aligned elongated ice crystals to form a directionally frozen polysaccharide hydrogel with aligned channels in which the aligned elongated ice crystals are located;
    thawing the directionally frozen polysaccharide hydrogel with the aligned channels by immersing the frozen ingestible polysaccharide hydrogel in a solution containing at least one ingestible soluble heat gelling protein, thereby melting and replacing the aligned elongated ice crystals with the at least one ingestible soluble heat gelling protein at a temperature below the gelling temperature of the soluble heat gelling protein, to produce a protein infused polysaccharide hydrogel, wherein protein loading varies based on the immersing time; and
    heating the protein infused ingestible polysaccharide hydrogel at a temperature above the gelling temperature of the at least one ingestible soluble heat gelling protein to create protein fibers to form a fibrous meat analogue food product.

2. The process according to claim 1, wherein the at least one ingestible soluble heat gelling protein comprises:
    i) an ingestible soluble heat gelling protein, wherein a concentration of the ingestible ingestible soluble heat gelling protein in the solution containing at least one ingestible soluble heat gelling protein is in a range from about 0.5 to about 30%; or
    ii) a mixture of ingestible soluble heat gelling protein and a non-heat gelling protein.

3. The process according to claim 1, wherein the ingestible polysaccharide hydrogel has a melting temperature greater than the gelling temperature of the ingestible soluble heat gelling protein.

4. The process according to claim 1, wherein the ingestible soluble heat gelling protein is any one or combination of whey protein isolate (WPI), soy protein, potato protein isolate, rubisco protein, mung bean protein and pea protein.

5. The process according to claim 1, wherein the solution containing at least one ingestible soluble heat gelling protein further comprises an ingestible non-heat gelling protein, and a heat induced trigger agent to trigger gelling of the ingestible non-heat gelling protein as the temperature is raised.

6. The process according to claim 1, wherein the step of heat treating the ingestible soluble heat gelling protein infused polysaccharide hydrogel is conducted at a solution temperature in a range from about 40° C. to about 150° C.

7. The process according to claim 5, wherein the heat induced trigger agent comprises: a salt, enzyme, pH modifier, or combination thereof.

8. The process according to claim 5, wherein the heat induced trigger agent is an enzyme microencapsulated within a meltable coating.

9. The process according to claim 1, wherein the ingestible polysaccharide hydrogel is selected from the group consisting of agar, fermentation derived gelatin, alginate, curdlan, kappa-carrageenan, kappa 2-carrageenan and iota-carrageenan, furcelleran, starch, modified starch, dextrins, konjac glucomannan, gellan gum, and combinations of xanthan gum, guar gum, locust bean gum and tara gum.

10. The process according to claim 1, wherein the solution containing at least one ingestible soluble heat gelling protein comprises: an aqueous solution or aqueous dispersion.

11. The process according to claim 1, wherein the at least one ingestible soluble heat gelling protein is a mixture comprising: an ingestible heat gelling protein and an ingestible non-heat gelling protein; and wherein the solution containing at least one ingestible soluble heat gelling protein, comprises about 15 to about 25 wt % of protein.

12. The process according to claim 1, wherein a concentration of the at least one ingestible soluble heat gelling protein in the solution is in a range from about 10 to about 30 wt %.

13. The process according to claim 1, wherein the solution containing the at least on ingestible soluble heat gelling protein has a temperature of about 1° C. to about 60° C.

14. The process according to claim 1, wherein protein loading further varies by varying a volume ratio of the ingestible polysaccharide hydrogel and the solution containing the at least one ingestible soluble heat gelling protein.

15. The process according to claim 1, wherein the step of directional freezing of the ingestible polysaccharide hydrogel is conducted by placing the ingestible polysaccharide hydrogel in contact with a pre-cooled substrate at a temperature of about minus 2° C. to about minus 196° C.

16. The process according to claim 1, wherein the ingestible polysaccharide hydrogel comprises a kappa-carrageenan hydrogel.

17. The process according to claim 1, wherein the ingestible polysaccharide hydrogel is a kappa-carrageenan hydrogel having a modulus in a range from about 100 to about 5000 Pascals.

18. The process according to claim 1, wherein the ingestible polysaccharide hydrogel is an agar hydrogel having an agar concentration in a range from about 0.1% to about 15 wt %.

19. The process according to claim 1, wherein the solution containing at least one ingestible soluble heat gelling protein further includes ingestible supplements that diffuse into the aligned channels.

20. The process according to claim 10, wherein the aqueous solution or aqueous dispersion comprise: flavors, tastants, emulsifiers, preservatives, colors, pH modifiers, texture modifiers or a combination thereof.

21. The process according to claim 19, wherein the ingestible supplements comprise: emulsions of esters of omega-3, omega-6, omega-9 fatty acids or a combination thereof.

22. The process according to claim 19, wherein the ingestible supplements comprise: water-soluble vitamins, including ascorbic acid (vitamin C), thiamin, riboflavin, niacin, vitamin $B_6$ (pyridoxine, pyridoxal, and pyridoxamine), folacin, vitamin $B_{12}$, biotin, and pantothenic acid.

23. The process according to claim 19, wherein the ingestible supplements comprise ingestible minerals.

24. The process according to claim 19, wherein the ingestible supplements comprise water insoluble vitamins.

25. The process according to claim 19, wherein the ingestible supplements comprise anti-oxidants.

26. The process according to claim 1, wherein the step of subjecting the ingestible polysaccharide hydrogel to directional freezing and inducing formation of aligned elongated ice crystals, further comprises: placing the ingestible polysaccharide hydrogel in contact with a pre-cooled substrate to give directional freezing in one direction; or placing the ingestible polysaccharide hydrogel between two pre-cooled substrates, wherein the directional freezing proceeds from opposite directions.

27. The process according to claim 2, wherein in the mixture of heat gelling protein and a non-heat gelling protein, a concentration of the ingestible heat gelling protein in the solution containing at least one ingestible soluble heat gelling protein is in a range from about 2 to about 10 wt% with the remainder being non-heat gelling protein to make up to a total of 25 wt% of the protein mixture.

* * * * *